Figure 1:
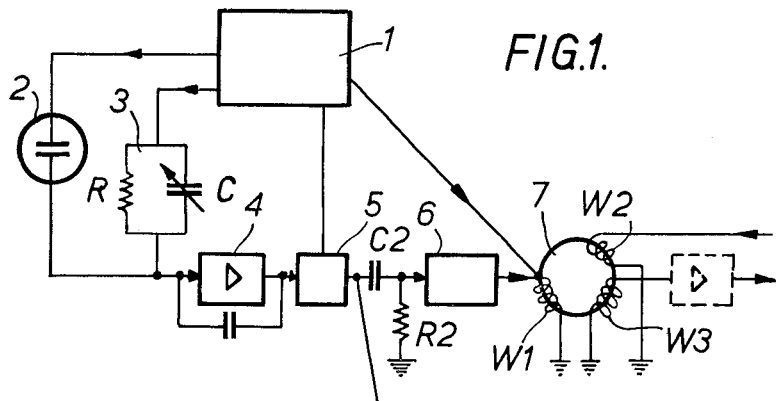

United States Patent Office 3,246,154
Patented Apr. 12, 1966

3,246,154
CONTROL SYSTEMS FOR NUCLEAR REACTORS
Donald Harrison, Dorset, England, assignor to United Kingdom Atomic Energy Authority, London, England
Filed Jan. 11, 1962, Ser. No. 165,591
Claims priority, application Great Britain, Jan. 17, 1961, 1,978/61
10 Claims. (Cl. 250—83.6)

This invention relates to control systems for example for nuclear reactors and is concerned in one application with a method of obtaining a trip signal for effecting reactor shut-down in response to excess neutron flux. It will be appreciated that in the design of such control systems, while failure to safety is of paramount importance, care must be taken to ensure that the risk of spurious trip signals being generated is reduced to a minimum.

The present invention uses as a flux sensitive instrument an ionisation chamber supplied with alternating polarising potentials. Such an arrangement has been proposed hitherto and it is a characteristic of A.C. operated chambers that, when the polarising potential produces saturation over most of the cycle, the output includes one current component, in phase with the supply, proportional to ionisation current and a second current component, in quadrature, proportional to the capacity of the chamber.

According to the invention a control system includes a flux measuring ionisation chamber, a basic A.C. generator connected to provide polarising potentials for the chamber, an integrator connected to receive the output of the chamber which includes a component of current in-phase with the polarising potential and component in quadrature therewith, means for feeding to the integrator comparable components of current adjusted in phase and amplitude such that the integrated in-phase components cancel at a value of the in-phase component corresponding to a given flux level, while the integrated quadrature components yield a residual signal at all flux levels, sampling means for sampling the integrator output at given intervals of electrical angle to produce sample pulses proportional to the current/time integrals of the components and means for applying said pulses to a control element responsive to the sample pulses due to the in-phase component of current.

It can be shown that for a waveform which is cyclic and contains no second harmonic components, sampling at $n\pi$ intervals will give an output which is proportional to the half cycle current-time integrals of the inphase component whilst sampling at the $(n+\frac{1}{2})\pi$ intervals will give an output proportional to the half cycle current-time integrals of the quadrature components.

In the present arrangement by sampling the integrated output of the mixed waveforms at intervals of $\pi/2$ of electrical angle, pulses proportional to the current time integrals of the respective components are obtained.

The pulses obtained by sampling as described may be separated and those proportional to the integrals of the inphase component used to energise a switch device, preferably a magnetic core element, operative in response to a zero signal to initiate a trip device. Those pulses proportional to the integrals of the quadrature component may be employed to monitor the working of the whole circuit. Alternatively, both sets of pulses may be retained in a single circuit to give trip action.

Figure 2:
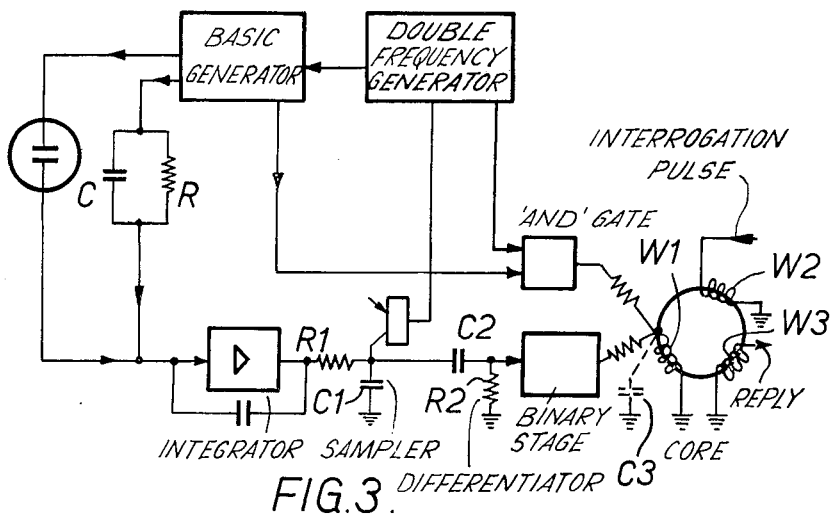
Figure 3:
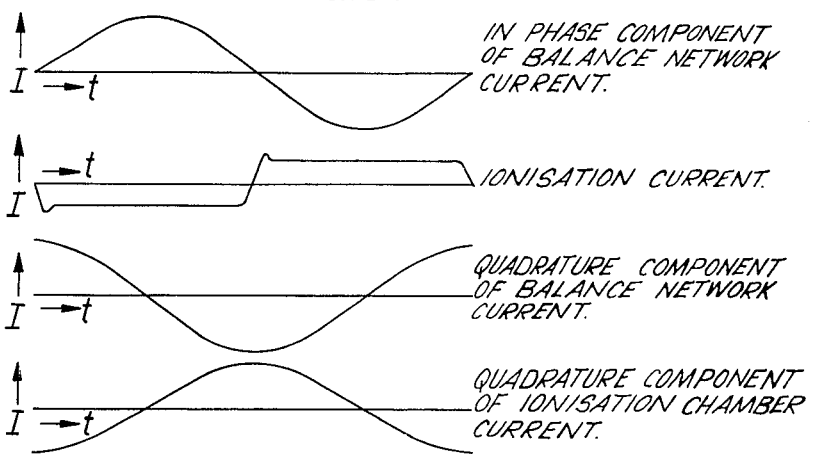

Examples of the way in which the invention can be carried into effect will now be described with reference to the accompanying drawings in which:

FIG. 1 shows diagrammatically one form of trip control circuit for a nuclear reactor, FIG. 2 shows diagrammatically an alternate form of the circuit shown in FIG. 1, and FIGS. 3–9 are representative of wave-forms produced at various points in the circuit.

Referring firstly to FIG. 1, a basic wave-form generator 1 is used to apply an alternating potential to an ionisation chamber 2 which is exposed to radiation in a nuclear reactor, and also to apply a further signal to a balance network 3 feeding a virtual earth integrator 4 which is also connected to the chamber output. The values of the components of the network 3 are so chosen that the quantity of current it passes into the integrator 4 per half cycle results in a current/time integral which is equal and opposite to that produced by the ionisation current per half cycle at a given flux level i.e. the required trip level. The capacitor C is adjusted to give a small residual current to the integrator 4 when balanced, or cancelled, by the current due to ionisation chamber capacity.

The output from the integrator is applied to a sampler 5 which samples the integrated output at $\pi/2$ intervals of electrical angle and produces a series of pulses proportional to the current/time integrals of the current components. The series of pulses are passed to a bistable circuit 6 which produces a rectangular wave-form. The latter is applied to a bias winding W1 of a magnetic core element 7 having a rectangular hysteresis loop. A further locally generated reference wave-form is applied to the bias winding W1 of a shape such that interlacing of the reference waveform and the signal waveform occurs at flux levels below the aforementioned given flux level, at which a trip signal is required, i.e. so called trip level. Under these conditions the winding W1 is energised by a constant bias current to provide steady saturation of the core element. The magnetic core element 7 is provided with interrogation winding W2 and response winding W3 and operates in known manner, such that when an interrogating pulse of proper sign and amplitude is applied to the winding W2, to cause the magnetic flux in the core due to the bias current to reverse, the flux reversal is detected by the response winding W3. Clearly, if no output from the response winding is obtained in response to an interrogating pulse then this is due either to loss of interlace between the waveforms fed to winding W1 as a result of the flux approaching trip level or a failure of the circuit applying the bias current, and a reactor shut-down is initiated. Means, not shown, are provided whereby if no reply signal is obtained in winding W3 in response to an interrogating pulse applied to W2 a reactor trip mechanism is actuated.

In order to increase the trip sensitivity it is permissible to allow the integrator to be overloaded except near its trip point and it will be shown that this allows the quadrature monitoring signals to vary over a limited range without affecting the operation of the unit. Thus an accurate balance of the quadrature currents is not essential.

In FIG. 2 which combines the trip control circuit with the monitor arrangements a double frequency generator, operating at a frequency $2f$, generates a push-pull sinusoidal output of frequency $f$ through a binary reduction. The frequency $f$ is chosen to be low compared with the safety circuit interrogating pulse frequency applied to winding W2 and different from any other frequency used on the reactor site.

Typically a frequency of about 70 c.p.s. might be used where the interrogating frequency is at several kilocycles, being different from 50, 60 or 400 c.p.s. mains supplies. A low frequency tends to lower capacitance currents and makes for less critical capacitance balance requirements.

The push-pull output feeds the ionisation chamber on one phase and the balance network on the other. The amplitude of the signal supplied to the chamber must be sufficient to ensure saturation over most of the period of the wave-form for the range of flux levels to be used. The required amplitude depends, therefore, on the flux range and design of the chamber, but may be expected to lie within 200–400 volts peak for a typical installation.

For satisfactory saturation of an RC1 chamber delivering a maximum of 50 μa., this potential would need to be about 300 volts.

Similarly to the circuit in FIG. 1, the signal applied to the balance network may be chosen as is convenient, since the components of the network may be given values to suit. The value of the resistive component R is so chosen that the quantity of current it passes into the virtual earth integrator per half cycle results in a current/time integral which is equal and opposite to that produced by ionisation current per half cycle at the required trip flux level. The capacitor C is adjusted to give a small residual current into the integrator when balanced by the ion chamber capacity current.

Figure 4:
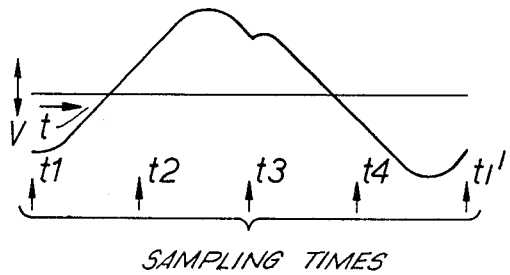

Consider the operation of the system when a small margin exists between trip point and working level (normal operation). Under these conditions the current into the integrator is the sum of the four wave-forms of FIG. 3. These wave-forms are such that the area per half cycle of ionisation current is somewhat less than the area per half cycle of the inphase component of the balance network and the quadrature component of balance network current is slightly greater than the quadrature component of current from the ionisation chamber. The resultant output from the integrator is shown in FIG. 4. This output is sampled by a sampling circuit, i.e. a transistor chopper, at the times shown $t_1$, $t_2$, $t_3$, $t_4$, $t_1'$, $t_2'$, $t_3'$ . . . .

It can readily be shown that the amplitude of the integrator output at the sampling time $t_1$, $t_3$, $t_1'$, et seq., is proportional to the difference in area of the two inphase components of current while the amplitude at sampling times $t_2$, $t_4$, et seq. is proportional to the residual difference current of the quadrature components.

The method of sampling is to permit the collector of a transistor chopper to follow the output signal except at the sampling instants, when the 2f wave-form is used to clamp to ground. The clamp is rapidly released and the collector returns to follow the integrator output. By suitable choice of time constants, the clamping instant can be made to give a rate of change very much faster than any other variation at the transistor chopper collector so that this signal, when differentiated by the network $R_2$, $C_2$, will produce short pulses at the clamping instants. The slow variations resulting from the integrator output and the resetting of the clamp can be made to give negligibly small signals if the time constants $R_2$, $C_2$, $R_1$, $C_1$ are correctly chosen.

Figure 5:
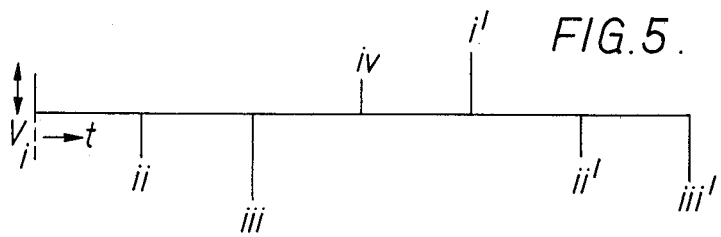

The resulting wave-form is shown in FIG. 5.

Figure 6:
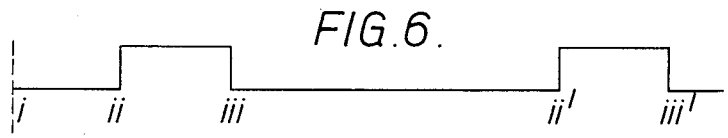

These pulses are supplied to a bistable circuit capable of responding to negative pulses only so that the output of this circuit will be a square wave-form as shown in FIG. 6; the leading edge of the pulse being determined by the residual difference current of the quadrature components and its trailing edge by the inphase component.

Figure 7:
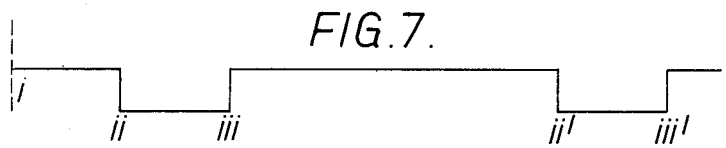

The addition of the f and 2f wave-forms through a sample "and" gate is arranged to produce a wave-form as shown in FIG. 7 which is equal and opposite to that of FIG. 6 and the sum of these two signals is supplied to bias winding W1 of the magnetic core. The flux set into the core maintains the core in saturation in one direction (the "off" direction).

As long as this condition persists, the interrogating pulses supplied by an independent input into the winding W2 will switch the core (to the "on" direction), but the core will be reset (to the off direction) at the termination of the interrogating pulse. This will result in an output pulse from winding W3 which is used to provide a reply. It may be noted that an improvement in reliability may be achieved by amplifying and inverting this pulse before transmission to the safety circuits.

Thus any failure of the pulses (ii) and (iii), FIG. 5, to reach sufficient amplitude to switch the binary unit results in loss of interlacing between the wave-forms of FIGS. 6 and 7 so that for part of a cycle the core is biased to the "on" state and interrogating pulses will be unable to produce the switching action. In addition, at another part of the cycle, the core will be saturated well beyond the "off" state and this will also inhibit the switching action. It may be noted here that variations, for whatever reason, in the amplitudes of the interlaced wave-forms will have either no effect, or will produce a trip signal.

The use of 3:1 interlaced wave-form has the advantage that no wave-form of this sort is produced elsewhere in the circuit and the leading and trailing edges are dependent upon the flux and monitoring, i.e. the inphase and quadrature, signals respectively. The use of a bistable circuit responsive to negative pulses only ensures that this unit cannot be operated to simulate correct performance by any wave-form but the true signal, and the retention of the positive pulses acts as a continuous check that the circuit retains its ability to discriminate in this way.

In order to prevent trip action due to small timing errors between the interlaced wave-forms, a small delay can be applied to this circuit by addition of a capacitor $C_3$. An open circuit, short-circuit or excessive leakage developing in this component will produce a trip signal.

The sensitivity of the system can be much increased if the integrator is arranged to be overloaded for all but nearly balanced input signals. This mode of operation is assumed in what follows.

The behaviour of the system for abnormal conditions will now be examined.

Figure 8:
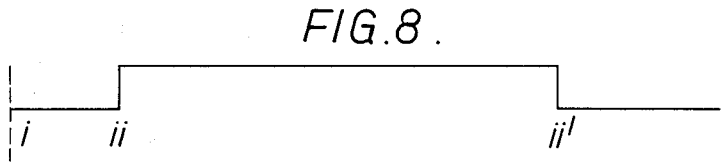
Figure 9:
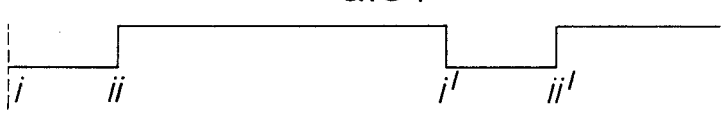

It is clear that, when the input signal reaches the predetermined trip level the wave-form of FIG. 6 will change to that shown in FIG. 8 so producing a trip condition, for as there is no inphase component, the binary unit can only respond to negative quadrature pulses of FIG. 5 and interlace is lost. If the input increases beyond this level, the wave-form will become that of FIG. 9, maintaining the trip condition. Clearly there can be no interlacing between the wave-forms of FIG. 6 and that of FIG. 9.

Small changes in the balance of the capacitor components will not effect the operation of the system until these become large enough either to saturate the integrator or to suppress the "quadrature" pulse. Which of these events occurs depends upon the direction in which the capacity balance changes but, in both cases, it can be shown that a trip signal will result. It may further be shown that these conditions are maintained whether or not the signal is producing an overload condition or saturation in the integrator. Thus the monitor facility is not sensitive to small changes in the quadrature balance but will produce a trip action for gross changes as might be expected to result from fault conditions.

A number of variations are possible using the same basic principles. For example, the monitor data may be separated from the signal data by the use of two sampling circuits appropriately timed (the required timing wave-form is available without modification in the 2f generator). It is also possible to use a resetting integrator instead of a linear integrator and sampling unit and this arrangement permits even harmonics to be present in the polarising or reference wave-form.

Margin to trip indication may be obtained either by use of linear amplification prior to integration followed by phase sensitive detection or the magnitude of the inphase pulses may be measured and indicated provided that the extent of the margin required is less than that which would cause saturation of the integrator.

Sinusoidal wave-forms do not have to be used in the polarising and reference supplies. The wave-forms can be of any convenient form providing they are low in even harmonics and that the rates of change are not such as to create difficulties in maintaining the required limits of balance of the quadrature components. A trapezoid is a convenient form.

The reasons why the proposed system has good fail-safe characteristics are enumerated below:

(i) The signal to be measured is alternating. This means that a spurious signal, to inhibit trip action, has to be of a specified frequency, phase and amplitude. The probability of obtaining such a condition can be made negligibly small, particularly if the channel frequency is chosen to be different from any other on the reactor site. Simplicity and freedom from drift are additional advantages which result from the use of A.C. signals.

(ii) The signal is balanced at the input against a reference so that zero signal constitutes a trip condition. Since zero signal is a likely result of circuit failure, this constitutes a fail-safe feature.

(iii) The circuit functions in such a way that in normal operation all parts of the circuit are exercised in all their possible states. Failure to operate correctly produces an immediate trip or alarm. The wanted action results from a timing re-arrangement and not from operation in a new mode.

(iv) The principle of operation permits sample pulses to be arranged in time in a manner different from any other generated wave-form. Spurious coupling within the equipment cannot produce a spurious fail-danger signal.

(v) The capacity component of current from the ion chamber can be used to provide an overall monitor which can be made to operate a trip or warning. When this monitor facility is combined in one circuit with the normal facility, the monitor checks the complete circuit.

Since the system uses a reference supply to determine the trip level, it is possible that a fail-danger condition could result from increase in the reference potential. This objection may be largely overcome if the quadrature current is obtained from the same supply. Under these conditions a significant change in the reference supply can provide a trip by causing sufficient unbalance in the quadrature components. A further improvement in this respect may be obtained by ensuring that the reference supply is produced by a circuit giving its maximum possible output amplitude—the most probable result of a fault will then be to cause an amplitude reduction. With regard to the polarising supply, it is not difficult to ensure that variations produce a trip due to capacity unbalance before any significant change occurs in the ionisation current.

I claim:

1. A control system including a flux measuring ionisation chamber, a basic A.C. generator connected to provide polarising potentials for the chamber, an integrator connected to receive the output of the chamber which includes a component of current in-phase with the polarising potential and a component in quadrature therewith, means for feeding to the integrator comparable components of current adjusted in-phase and amplitude such that the integrated in-phase components cancel at a value of the in-phase component corresponding to a given flux level, the integrated quadrature components yielding a residual signal at all flux levels, sampling means for sampling the integrator output at given intervals of electrical angle to produce sample pulses proportional to the current/time integrals of the components, and means for applying said pulses to a control element responsive to the sample pulses due to the in-phase component of current.

2. A control system as claimed in claim 1, including means for deriving from the pulses a signal wave-form whose leading and trailing edges are dependent upon the quadrature and in-phase pulses and a control element responsive to the signal wave-form.

3. A control system as claimed in claim 2 having a sampling circuit which includes a clamping circuit arranged to operate at twice the frequency of the basic generator to effect sampling at $\pi/2$ intervals of electrical angle.

4. A control system as claimed in claim 3 including means forming in effect a double frequency generator for operating the clamping circuit.

5. A control system as claimed in claim 1, including means for generating a reference wave-form of an amplitude and frequency which is equal and opposite to that of a wave-form obtained from the sample pulses over a given range of flux levels below said given flux level, under normal operation, means for combining the two wave-forms in a manner tending to effect interlace therebetween and means applying the resultant signal to a control element having distinctive responses to equality and inequality of the two wave-forms.

6. A control system as claimed in claim 5 in which the reference wave-form is obtained from a gate circuit requiring for its operation inputs from both the basic and double frequency generators.

7. A control system as claimed in claim 3 including means for passing the output of the sampling circuit to a bistable unit operative in responsive to those pulses of a given sign which are greater than a given amplitude to produce the signal wave-form.

8. A control ssytem as claimed in claim 2 in which the control element is a magnetic core having a first input winding connected to receive the resultant signal from the summation of the reference wave-form and the signal wave-form, a second winding connected to an independent pulse input and an output winding adapted to operate a trip mechanism.

9. A control system as claimed in claim 8 in which means are provided for inverting and amplifying the signal received by the output winding.

10. A control circuit comprising an ionisation chamber, a first A.C. generator connected to supply alternating potentials to the chamber, an integrator connected to receive the in-phase and quadrature components of chamber output current, means for supplying to the integrator a reference wave-form composed of comparable components of current adjusted in phase and amplitude such that the integrated output of the in-phase components cancel at a given flux level while the integrated quadrature components yield a residual signal at all flux levels, means for deriving pulses proportional in amplitude to the in-phase component, when present, and to the quadrature component, means for deriving from said pulses a signal wave-form whose leading and trailing edges are phased with said pulses, means for generating a reference wave-form which is complementary to said signal wave-form over a given range of flux levels, means for combining said wave-forms such that the interlacing therebetween is effected over said given range of flux levels, a magnetic core element, means for applying the combined wave-forms to the core element and means for indicating the flux condition of the core element.

References Cited by the Examiner

UNITED STATES PATENTS

| | | | |
|---|---|---|---|
| 2,685,027 | 7/1954 | Alvarez | 250—83.6 |
| 2,819,408 | 1/1958 | Swift | 250—83 |
| 2,982,857 | 5/1961 | Clark | 250—83.6 |

RALPH G. NILSON, *Primary Examiner.*